United States Patent
Smith, Jr. et al.

(10) Patent No.: US 9,387,657 B2
(45) Date of Patent: Jul. 12, 2016

(54) METHOD OF FABRICATING A CURVED COMPOSITE STRUCTURE USING COMPOSITE PREPREG TAPE

(71) Applicant: The Boeing Company, Chicago, IL (US)

(72) Inventors: Daniel Richard Smith, Jr., Redmond, WA (US); Andrew E. Modin, Enumclaw, WA (US); Edoardo Depase, Manhattan Beach, CA (US); Donald Chester Darrow, Madison, GA (US); Mark Klewiada, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 595 days.

(21) Appl. No.: 13/736,021

(22) Filed: Jan. 7, 2013

(65) Prior Publication Data
US 2014/0065354 A1  Mar. 6, 2014

Related U.S. Application Data

(63) Continuation-in-part of application No. 12/945,024, filed on Nov. 12, 2010, now Pat. No. 8,551,380.

(51) Int. Cl.
*B29C 55/04* (2006.01)
*B32B 38/00* (2006.01)
*B29C 70/54* (2006.01)
*B29C 70/30* (2006.01)

(52) U.S. Cl.
CPC ............. *B32B 38/0012* (2013.01); *B29C 70/30* (2013.01); *B29C 70/541* (2013.01); *Y10T 156/1002* (2015.01); *Y10T 428/2419* (2015.01); *Y10T 428/24628* (2015.01)

(58) Field of Classification Search
None
See application file for complete search history.

(56) References Cited

U.S. PATENT DOCUMENTS

| | | | |
|---|---|---|---|
| 3,598,006 | A | 8/1971 | Gerber et al. |
| 3,983,282 | A | 9/1976 | Seemann, III |
| 4,016,022 | A | 4/1977 | Browning et al. |
| 4,120,632 | A | 10/1978 | Stoeberl |
| 4,132,755 | A | 1/1979 | Johnson |
| 4,180,608 | A | 12/1979 | Del |
| 4,622,091 | A | 11/1986 | Letterman |
| 4,726,924 | A | 2/1988 | Mittelstadt |

(Continued)

FOREIGN PATENT DOCUMENTS

| | | |
|---|---|---|
| CN | 102555229 A | 7/2012 |
| EP | 0271263 | 6/1988 |

(Continued)

OTHER PUBLICATIONS

European Search Report, dated Aug. 17, 2012, regarding Application No. EP11187925 (EP2452806), 11 pages.

(Continued)

*Primary Examiner* — Edmund Lee
(74) *Attorney, Agent, or Firm* — Yee & Associates, P.C.

(57) ABSTRACT

A method is provided of fabricating a composite stiffener having a curved web and at least one curved flange. A substantially straight length of unidirectional prepreg tape is placed on a carrier. The at least one curved flange is formed by using the carrier to steer a first portion of the tape onto a first curved tool surface. The curved web is formed by using the carrier to form a second portion of the tape onto a second curved tool surface.

20 Claims, 12 Drawing Sheets

(56) References Cited

U.S. PATENT DOCUMENTS

| | | |
|---|---|---|
| 4,902,215 A | 2/1990 | Seemann, III |
| 4,942,013 A | 7/1990 | Palmer et al. |
| 4,961,700 A | 10/1990 | Dunbar |
| 5,052,906 A | 10/1991 | Seemann |
| 5,116,216 A | 5/1992 | Cochran et al. |
| 5,123,985 A | 6/1992 | Evans et al. |
| 5,129,813 A | 7/1992 | Shepherd |
| 5,316,462 A | 5/1994 | Seemann |
| 5,364,584 A | 11/1994 | Imanara et al. |
| 5,427,725 A | 6/1995 | White et al. |
| 5,439,635 A | 8/1995 | Seemann |
| 5,441,692 A | 8/1995 | Taricco |
| 5,576,030 A | 11/1996 | Hooper |
| 5,601,852 A | 2/1997 | Seemann |
| 5,702,663 A | 12/1997 | Seemann |
| 5,721,034 A | 2/1998 | Seemann, III et al. |
| 5,904,972 A | 5/1999 | Tunis, III et al. |
| 5,939,013 A | 8/1999 | Han et al. |
| 5,958,325 A | 9/1999 | Seemann, III et al. |
| 6,090,335 A | 7/2000 | McClure et al. |
| 6,299,819 B1 | 10/2001 | Han |
| 6,391,436 B1 | 5/2002 | Xu et al. |
| 6,406,659 B1 | 6/2002 | Lang et al. |
| 7,186,361 B2 | 3/2007 | Kasai et al. |
| 7,469,735 B2 | 12/2008 | Brown et al. |
| 7,544,261 B1 | 6/2009 | Nogueroles Vines et al. |
| 7,603,017 B2 | 10/2009 | Cianciotto et al. |
| 7,670,525 B2 | 3/2010 | Weidmann et al. |
| 7,871,553 B2 | 1/2011 | Wilkerson et al. |
| 7,943,076 B1 | 5/2011 | Hawkins et al. |
| 7,975,549 B2 | 7/2011 | Fetzer et al. |
| 7,993,480 B2 | 8/2011 | Anderson et al. |
| 8,066,929 B2 | 11/2011 | Eberth et al. |
| 8,333,858 B2 | 12/2012 | Rubin et al. |
| 8,349,105 B2 | 1/2013 | Kehrl et al. |
| 8,551,380 B2 | 10/2013 | Hawkins et al. |
| 2006/0059848 A1 | 3/2006 | MacDonald-Schmidt et al. |
| 2006/0249868 A1 | 11/2006 | Brown et al. |
| 2007/0161483 A1 | 7/2007 | Raf |
| 2007/0175572 A1 | 8/2007 | Rubin et al. |
| 2007/0175575 A1 | 8/2007 | Rubin et al. |
| 2008/0053599 A1 | 3/2008 | Aijima |
| 2009/0148647 A1 | 6/2009 | Jones et al. |
| 2009/0239018 A1 | 9/2009 | Aijima |
| 2009/0261199 A1 | 10/2009 | McCarville et al. |
| 2009/0263618 A1 | 10/2009 | McCarville et al. |
| 2010/0080942 A1 | 4/2010 | McCarville et al. |
| 2010/0136293 A1 | 6/2010 | Kubryk et al. |
| 2011/0097554 A1 | 4/2011 | Kehrl et al. |
| 2011/0192541 A1 | 8/2011 | Anderson et al. |
| 2012/0076973 A1 | 3/2012 | Guzman et al. |
| 2012/0098155 A1 | 4/2012 | Kubryk et al. |
| 2013/0084434 A1 | 4/2013 | Kehrl et al. |
| 2014/0027048 A1 | 1/2014 | Hawkins et al. |

FOREIGN PATENT DOCUMENTS

| | | |
|---|---|---|
| EP | 0348831 | 1/1990 |
| EP | 0816438 | 1/1998 |
| EP | 0990507 A2 | 4/2000 |
| EP | 1038656 | 9/2000 |
| EP | 1894706 A1 | 3/2008 |
| GB | 2467417 | 8/2010 |
| JP | 61202823 | 9/1986 |
| JP | 2012101538 A | 5/2012 |
| PT | 2452806 E | 10/2014 |
| WO | 2009020971 A2 | 2/2009 |
| WO | WO2009112694 | 9/2009 |
| WO | WO2014107241 A1 | 7/2014 |

OTHER PUBLICATIONS

Brittles, "New Developments in Resin Transfer Moulding," Proc. 19th International Composites Congress, Nov. 1994, pp. 11-26.

Buckingham et al., "Automating the Manufacture of Composite Broadgoods," Composites, IPC Business Press Ltd., Haywards Heath, GB, vol. 27A, No. 3, Mar. 1996, pp. 191-200.

Sieberg et al., "An advanced FRP manufacturing technique asserts itself: Practical experience with the vacuum injection process," Studiedag Vakuuminjecteren, XP002169062, Oct. 27, 1998, pp. 13-19. (English translation and original German-language article).

Williams et al., "Resin Infusion under Flexible Tooling (RIFT): A Review," Composites Part A: Applied Science and Manufacturing, vol. 27, No. 7, 1996, pp. 517-524.

Hohfeld et al., "Consolidation of thick, close, circular knitted glass fiber textiles with epoxy resin into flat panels, tubes, and T-profiles," 3rd International Conference of Flow Processes in Composite Materials, Jul. 1994, pp. 120-142.

Kherl et al., "Curved Composite Frames and method of Making the Same," U.S. Appl. No. 13/684,988, filed Nov. 26, 2012, 64 pages.

Guzman et al., "Method and Apparatus for Producing Contoured Composite Structures and Structures Produced Thereby)," U.S. Appl. No. 13/013,097, filed Jan. 25, 2011, 94 pages.

International Search Report and Written Opinion, dated Apr. 3, 2013, regarding Application No. PCT/US2013/070918, 12 pages.

International Preliminary Report on Patentability, dated Jul. 7, 2015, regarding Application No. PCT/US2013/070918, 7 pages.

Notice of Allowance dated Jun. 5, 2013 regarding U.S. Appl. No. 12/945,024, 15 pages.

International Search Report and Written Opinion, dated Mar. 10, 2015, regarding Application No. PCT/US2014/052457, 19 pages.

Non-final office action dated Nov. 2, 2012 regarding U.S. Appl. No. 12/945,024, 15 pages.

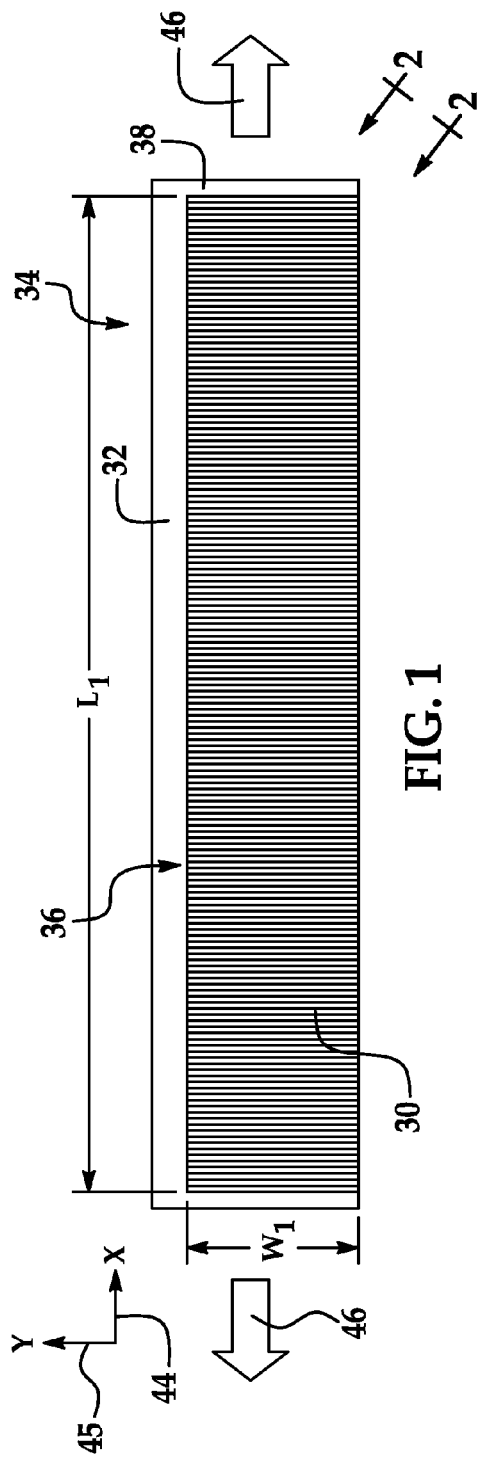
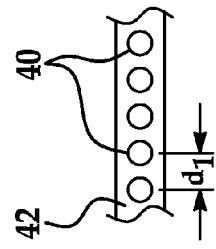
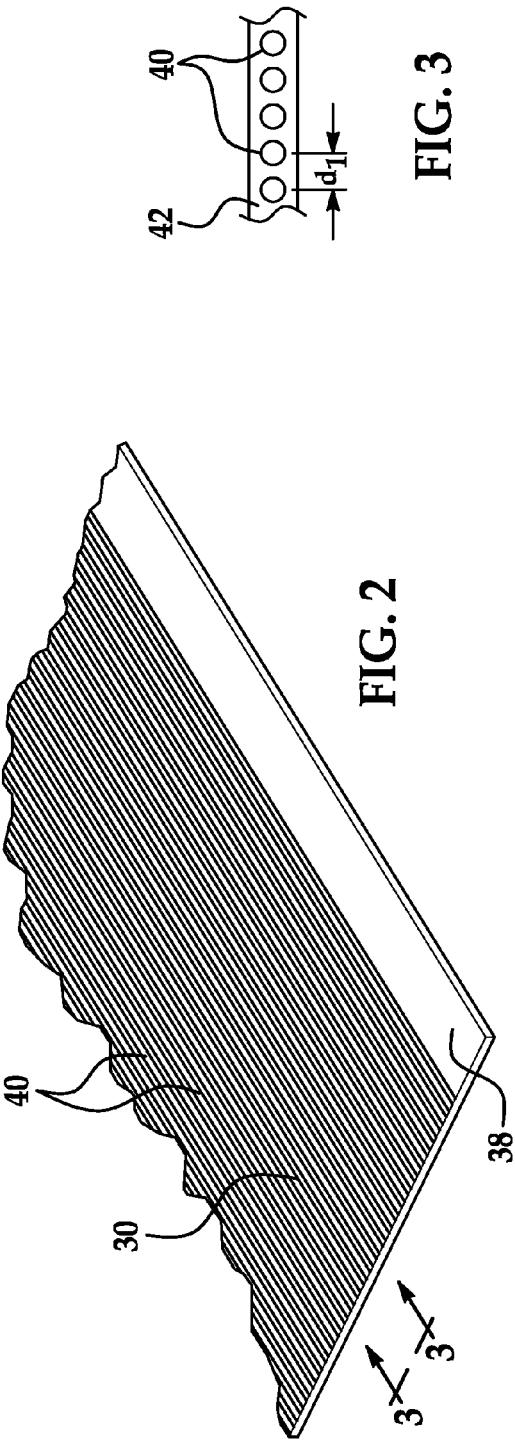

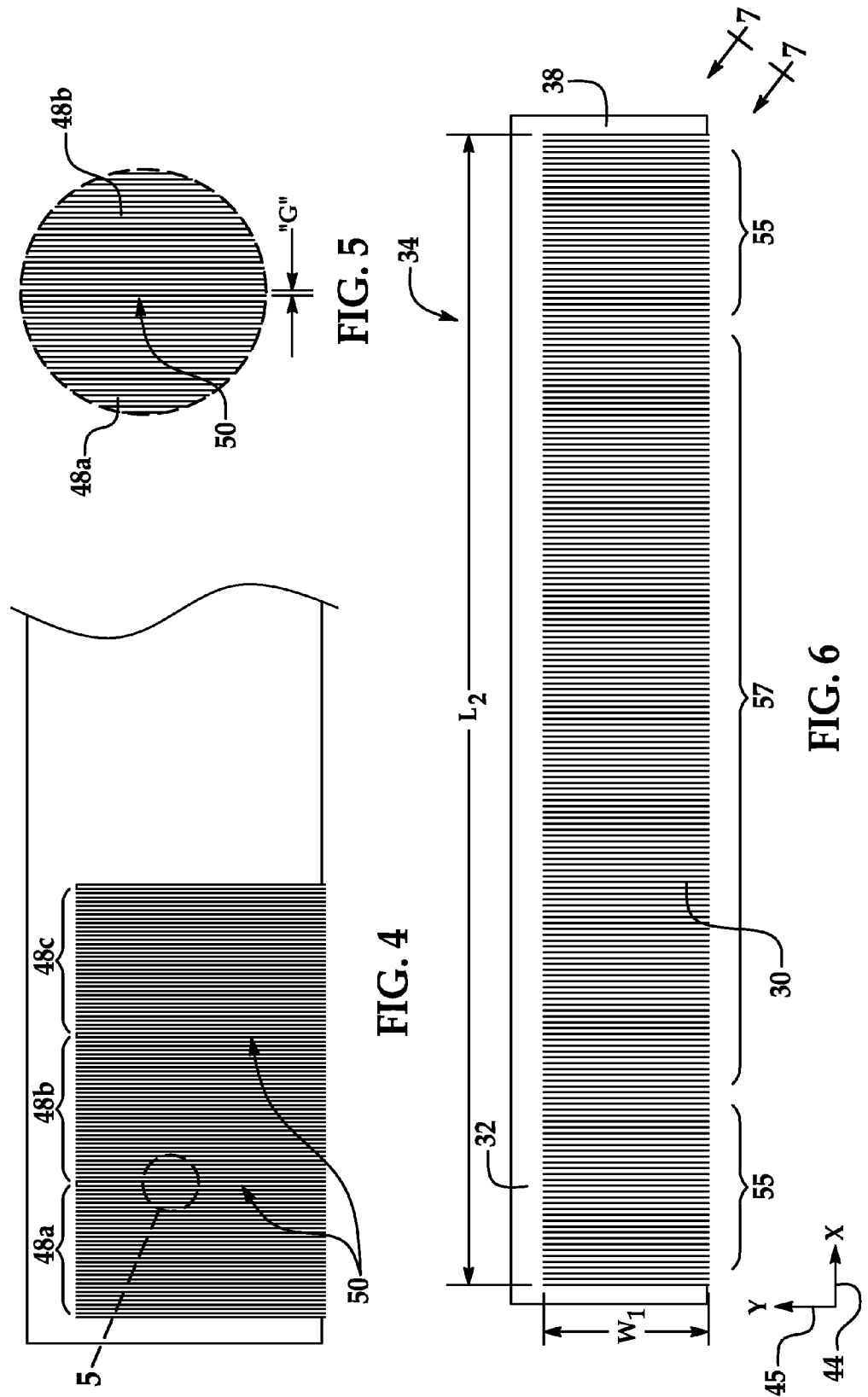

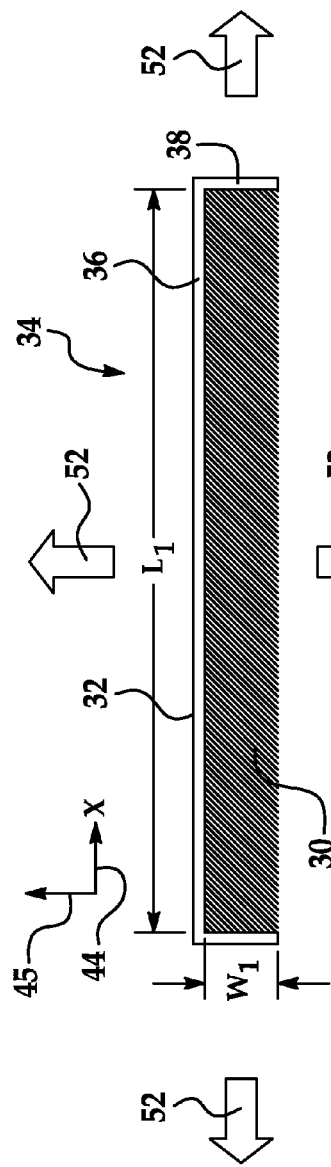
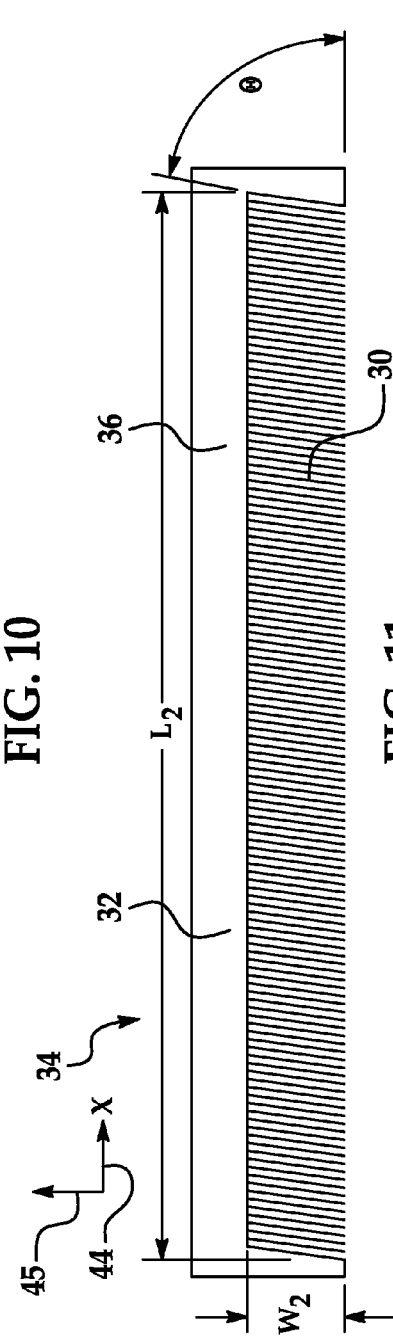
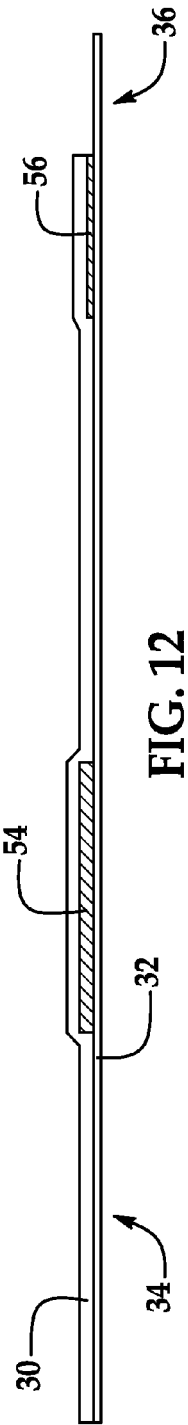
FIG. 10
FIG. 11
FIG. 12

METHOD OF FABRICATING A CURVED COMPOSITE STRUCTURE USING COMPOSITE PREPREG TAPE

CROSS REFERENCE TO RELATED APPLICATIONS

This application is a continuation-in-part of U.S. patent application Ser. No. 12/945,024 filed Nov. 12, 2010, now U.S. Pat. No. 8,551,380, and published May 17, 2012 as US Patent Publication No. 20120121866, the entire disclosure of which is incorporated by reference herein.

BACKGROUND INFORMATION

1. Field

This disclosure generally relates to processes for fabricating curved composite structures, and deals more particularly with a method of fabricating composite structures such as stiffeners having compound curves using composite prepreg tape.

2. Background

During layup of prepreg plies over a tool, it is sometimes necessary to closely conform the plies to curves, contours and/or features of the tool in order to assure that the fibers follow the load path, and the layup is dimensionally accurate and substantially free of voids, wrinkling and/or buckling. Known techniques for conforming plies to curved tool surfaces involve darting, cutting and/or splitting the plies during the layup process, and/or extensive hand sweeping to conform a ply to contoured tool surfaces. These techniques can be time consuming and/or may not result in a cured part having the desired mechanical strength. Another solution to the problem involves incrementally steering relatively narrow slit prepreg tape onto a contoured tool in order to form curved plies. However the use of slit tape may increase material costs and reduce production rates since laying down slit tape may be more time consuming.

Accordingly, there is a need for a method of laying up and forming curved composite plies, especially 0 degree plies, using substantially straight unidirectional prepreg tape. There is also a need for a method of laying up and forming curved zero degree plies that avoids the need for incrementally steering individual strips of slit tape around a curved tool.

SUMMARY

The disclosed configurations provide a method of supporting, positioning and deforming straight, unidirectional prepreg tape, while it is being conformed to complex shapes, contours and features of a tool. Straight lengths of unidirectional prepreg tape are used to form structures having compound curves. The method utilizes a deformable carrier film to support plies formed from the tape during the layup process in order to prevent the plies from wrinkling and/or buckling as they are being laid up. Use of the carrier film allows the prepreg plies to be accurately positioned and uniformly deformed as needed to conform to contoured tool surfaces. The carrier film may also be used to stabilize a composite ply during handling and transporting. The method may eliminate the need for the use of narrow slit tape, and relatively expensive automated slit tape placement equipment to incrementally layup zero degree plies. The method may also reduce or eliminate the need for hand working, darting, cutting, and splitting of plies during the layup process. Further, the method may reduce the time required for laying up and forming complex contoured structures by using full width composite prepreg tape. Additionally, the method may improve the accuracy of ply boundaries and provide more uniform deforming of ply material when required, resulting in improvements in both the strength and appearance of cured composite parts.

The disclosed method includes laying up a zero degree ply on a deformable carrier film in a substantially rectilinear or straight direction. The zero degree ply may comprise multiple widths of a prepreg tape or a single width of the tape arranged in different layers, or in spaced apart segments. The ply segments may be staggered and then overlapped in a subsequent forming operation to create a desired ply length.

According to one disclosed configuration, a method is provided of laying up a composite part on a tool. The method comprises providing a length of a composite resin tape reinforced with unidirectional fibers having a substantially zero degree fiber orientation and placing the tape on a deformable carrier film. The method further comprises forming the tape and the carrier film onto a first curved surface of a forming tool, and then forming the tape and the carrier film about a curved axis onto a second curved surface on the forming tool. The method also includes removing the carrier film from the formed prepreg tape. Placing the tape on the carrier film may include placing the tape into face-to-face contact with the carrier film and compacting the tape against the carrier film. The method may further comprise contouring at least one edge of the tape along its length. The tape may be formed onto the second curved surface of the tool by deforming the carrier film during the forming process.

According to another disclosed configuration, a method is provided of fabricating a curved composite structure having at least two curved legs. The method comprises providing a length of a composite prepreg tape having unidirectional reinforcing fibers with a substantially zero degree fiber orientation. The method further comprises adhering the tape to a film and forming a first leg of the structure by forming the film and a first portion of the width of the tape over a first curved surface of a forming tool. The method further comprises forming a second leg of the structure by forming the film and a second portion of the width of the tape onto a second curved surface of the forming tool. The method also includes removing the film from the formed tape and curing the formed prepreg tape.

According to still another configuration, a method is provided of fabricating a composite stiffener having a curved web and at least one curved flange. The method comprises laying up a straight length of unidirectional prepreg tape on a carrier film. The method further comprises forming the flange by using the carrier film to steer a first portion of the tape onto a first curved tool surface, and forming the web by using the carrier film to form a second portion of the tape onto a second curved tool surface. The method further includes removing the carrier film from the formed tape, and curing the formed ply.

According to a further configuration, a method is provided of laying up a multi-ply composite part on a tool having contoured surfaces. The method includes providing a deformable carrier film and reinforcing a portion of the carrier film against deforming, including impregnating the carrier film portion with reinforcing fibers. The method also includes placing a composite doubler on a surface of the carrier film, and placing a strip of release film on the surface of the carrier film. A composite ply is placed on the surface of the carrier film overlying the doubler and the strip of release film. The method further includes laying down a plurality of courses of unidirectional prepreg fiber tape in a side-by-side relationship on the carrier film surface;

BRIEF DESCRIPTION OF THE ILLUSTRATIONS

FIG. 1 is an illustration of a plan view of a composite prepreg ply held on a deformable carrier film, prior to deforming.

FIG. 2 is an illustration of a perspective view of a corner of the carrier film viewed from the direction shown as '2' in FIG. 1.

FIG. 3 is an illustration of a view of the ply in direction shown as '3' in FIG. 2.

FIG. 4 is an illustration of a plan view of the carrier film showing several courses of composite material having been applied to the film.

FIG. 5 is an illustration of the area designated as '5' in FIG. 4.

FIG. 6 is an illustration similar to FIG. 1 but showing the carrier film and the ply having been deformed.

FIG. 10 is an illustration of a plan view of a carrier film having a 45 degree ply compacted thereon, prior to deforming.

FIG. 11 is an illustration similar to FIG. 10 but showing the carrier film and ply having been deformed in orthogonal directions.

FIG. 12 is an illustration of a sectional view of a carrier film having a ply, a ply doubler and a release film strip applied thereto.

DETAILED DESCRIPTION

Figure 8:
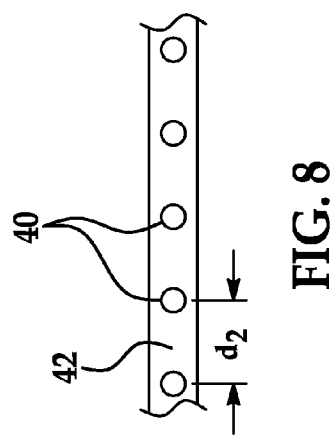
FIG. 8 is an illustration of a sectional view of the deformed ply viewed in the direction shown as '8' in FIG. 7.

Referring first to FIGS. 1, 2 and 3, a ply 30 of composite resin material is held in face-to-face contact on a carrier film 32 to form a ply carrier assembly 34. The carrier film 32 may be used to transport the ply 30 and/or to apply the ply 30 to a tool (not shown) during a layup process for producing a composite part layup (not shown). In the example illustrated in FIGS. 1-3, the ply 30 may be a prepreg that includes unidirectional reinforcing fibers 40 having a 90 degree orientation, however other plies (not shown) in the part layup may have other fiber orientations based on a predefined ply schedule.

The fibers 40 are pre-impregnated with a suitable polymer resin 42 which acts as a matrix to hold the fibers 40 in the desired orientation following curing. The composite ply 30 has a length $L_1$ and a width $W_1$ prior to being deformed during the layup process, as will be described in more detail below. The ply 30 is adhered to the carrier film 32 by the tackiness of the uncured resin 42 in the ply 30, however additional tackifiers may be used to provide the necessary adherence between the ply 30 and the carrier film 32. Following placement of the ply 30 on the carrier film 32, the ply 30 may be compacted against the carrier film 32 to assure that the ply is substantially free of buckling, wrinkles or other irregularities.

The ply 30 may be placed on the carrier film 32 so as to leave one or more edge margins 36, 38 on the carrier film 32 around the ply 30 to facilitate handling of the carrier film 32 and/or attachment of hardware or equipment (not shown) to the carrier film 32 that may be used to deform, manipulate and/or hold the carrier film 32 during the layup process. As will be discussed below, once compacted on the carrier film 32, the ply carrier assembly 34 can be deformed to fit different contours and shapes of a tool (not shown). The carrier film 32 allows for controlled and uniform or non-uniform deforming of the resin 42, and may also be used only as a carrier for transporting the prepreg ply 30 from an offline layup station (not shown) to the layup tool (not shown). As used herein, "deform" and "deforming" refer to stretching and/or shearing of a ply material in one or more directions, including simple and compound curves, and within one or more planes.

The carrier film 32 may be deformed in at least one direction, which in the illustrated example, is along an X axis 44, transverse to the orientation of the fibers 40. The carrier film 32 may comprise, for example and without limitation, a latex rubber or similar natural or synthetic deformable material having a thickness suitable for the application. The carrier film 32 material may be an elastic material that returns substantially to its original size and shape following deforming.

During the layup process, the ply 30 may be deformed by grasping the carrier film 32 at the opposite edge margins 38 and pulling carrier film 32 in opposite directions indicated by the arrows 46, substantially along the X axis 44.

Prior to the ply 30 being deformed, the fibers 40 may have an inter-spacing $d_1$. The visco-elastic resin 42 (FIG. 3) yields when deformed in a direction perpendicular to the fiber direction (in this case, the X axis 44), thereby allowing the fibers 40 to slip or shear substantially simultaneously in a direction parallel to the fiber direction, i.e. along the Y axis 45, which permits the prepreg ply 30 to conform to the contours of a layup tool (not shown).

Referring to FIGS. 4 and 5, the ply 30 may be applied to the carrier film 32 by placing a plurality of individual courses 48a, 48b, 48c of unidirectional split tape or tows on the carrier film 32, in a side-by-side, substantially parallel and abutting relationship either by hand or by using automated fiber placement equipment (not shown). Depending on the application and the particular materials being used, the edges 50 of the courses 48 may overlap slightly or may form gaps G between the courses 48. Deforming of the carrier film 32 may be used to control the size of the overlap or gap G between the courses 48 during layup of the ply 30 on a tool (not shown). Furthermore, the carrier film 32 may be used to change the grade of a prepreg material used to form the ply 30. For example, the grade (areal weight) of a prepreg material may be changed by uniformly deforming the material to a desired grade. Changing the grade of a prepreg material in this manner using the carrier film 32 may be useful in producing interleafed doublers that may reduce part weight, and/or material costs.

Figure 7:
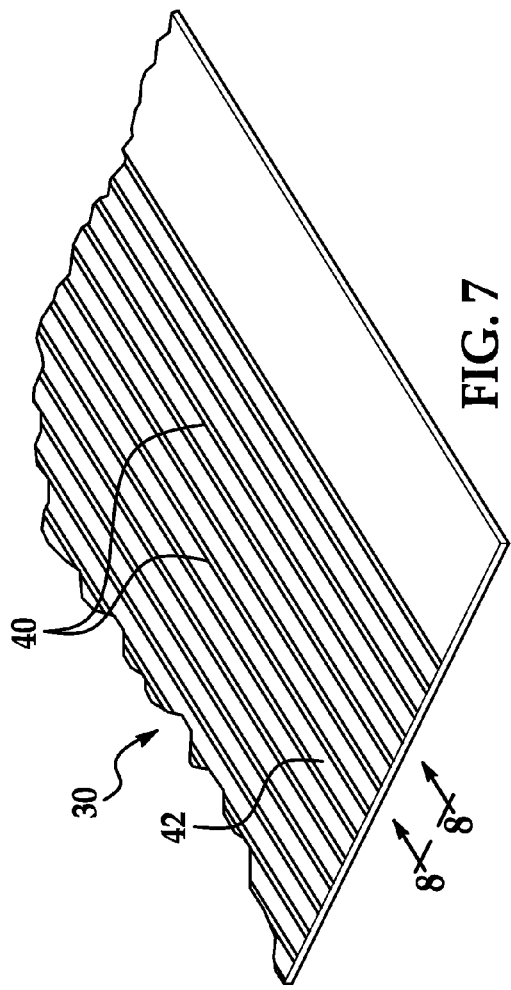
FIG. 7 is an illustration similar to FIG. 2 showing a corner of the ply and the carrier film after deforming.

FIGS. 6, 7 and 8 illustrate the ply 30 following deformation along the X axis 44 in the direction of the arrows 46 in FIG. 1. From FIG. 6 it can be seen that while the width $W_1$ of the ply 30 remains substantially the same, the ply 30 has been deformed to a greater length $L_2$ as a result of the deforming of the carrier film 32. Deforming of the carrier film 32 effectively deforms the resin 42 in the ply 30 which results in an increase in the spacing between the reinforcing fibers to a dimension $d_2$ (FIG. 8) which is greater than $d_1$ (FIG. 3). Deforming the ply 30 in this manner may allow the ply 30 to better conform to contours and other features of a tool surface (not shown) during the layup process, and may stabilize the ply material during layup. The carrier film 32 may prevent the prepreg ply 30 from splitting, wrinkling and/or buckling as it is being formed over a tool (not shown), and may allow the ply 30 to be precisely positioned on the tool during the layup process. It should be noted here that generally, when deforming a 90 degree ply 30 as described above in connection with FIGS. 1-8, the fibers 40 may be expected to deform substantially uniformly along the X axis 44. However, when deforming non-90 degree plies 30, the fiber deformation may not be uniform. For example, when deforming a 0 degree ply 30 (not shown) in the direction of the X axis 44, the fibers 40 near the ends (FIG. 6) of the ply 30 may shear at an angle (not shown) relative to the fibers 40 near the center 57 of the ply 30 which retain their 0 degree orientation. This shearing effect may occur gradually, growing increasingly from the center 57 toward the ends 55. Compensation for this shearing deformation may be achieved by cutting the ends 55 of the ply 30 at a pre-selected angle (not shown). When deforming a 45 degree ply 30, both shearing and stretching of the fibers 40 may occur.

Figure 9:
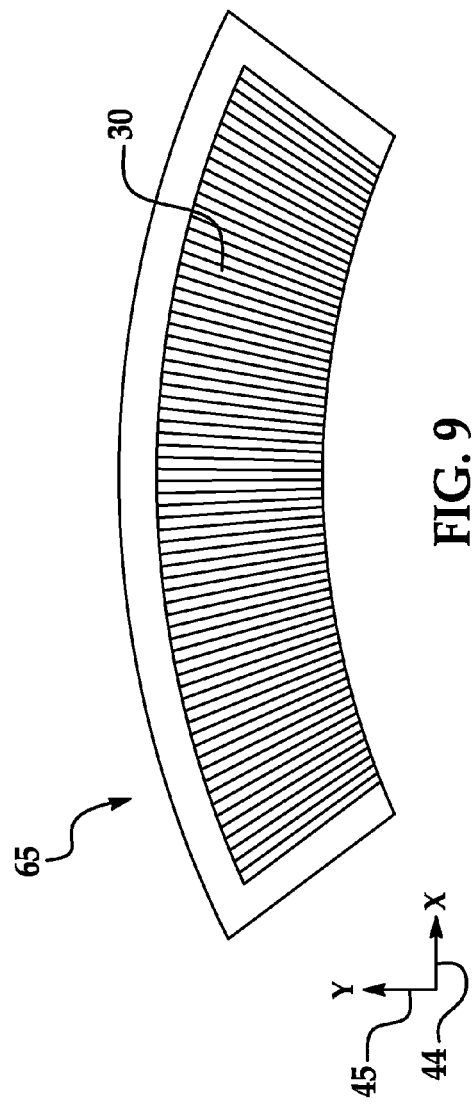
FIG. 9 is an illustration of a plan view of a 90 degree ply on a carrier film that has been deformed to stretch the ply into a fan shaped pattern.

FIG. 9 illustrates the use of the carrier film 32 to deform a 90 degree ply 30 into a radial or fan-like pattern 65 within a single plane, wherein the fiber directions are shown in solid lines. Although not shown in the Figure, this same radial pattern 65 may be deformed into other planes.

FIGS. 10 and 11 illustrate a prepreg ply 30 having a 45 degree fiber orientation which has a width $W_1$ and a length $L_1$ prior to deforming as shown in FIG. 10. In this example, appropriate tension 52 applied to the carrier film 32 causes the carrier film 32 to deform along orthogonal X and Y axes 44, 45, and likewise deforms the ply 30 to both a greater length $L_2$ and a greater width $W_2$. Stretching of the carrier film 32 along the Y axis 45 results in a change in the orientation angle of the fibers 40 to some angle θ greater than 45 degrees. Although the ply examples shown in FIGS. 1-10 are shown being deformed along single axis or two orthogonal axes 44, 45, the ply 30 may be deformed in other directions and within other planes, depending on the requirements of the application and the geometry of the tool (not shown) to which the ply 30 must be conformed, as well as how tension 52 is applied to the carrier film 32. Moreover, as will be discussed below, it may be possible to deform only one or more portions of the carrier film 32 so that only corresponding portions (not shown) of the ply 30 are deformed during the layup process.

In some applications, it may be possible to use the carrier film 32 to pre-position and place additional items of a layup assembly on a tool (not shown), such as without limitation, doublers, release films, and caul plates, along with the ply 30. For example, FIG. 12 illustrates a ply 30 placed on a carrier film 32 in which a composite doubler 54 is sandwiched between the ply 30 and the carrier film 32. Similarly, a strip 56 of release film is sandwiched between the ply 30 and the carrier film 32 along the edge margin 36 on the carrier film 32 which may aid in releasing and peeling the carrier film 32 away from the laid up ply 30. Thus, in this example, during the layup process, use of the carrier film 32 allows the ply 30, the doubler 54 and the release film strip 56 to be precisely positioned relative to each other, and to be laid up over a tool (not shown) in a single step.

Figure 13:
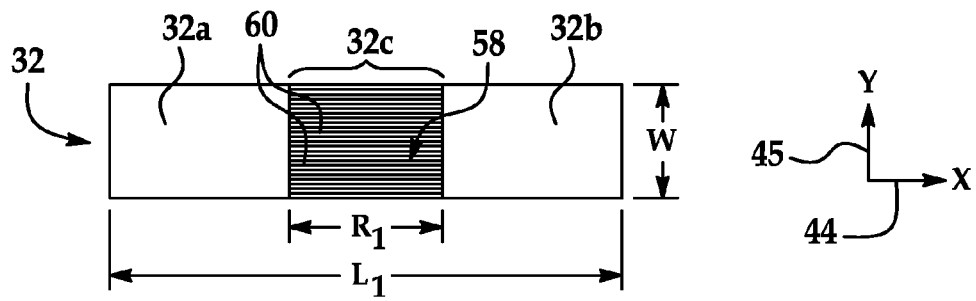
FIG. 13 is an illustration of a carrier film prior to deforming which includes a substantially non-deformable area containing a fiber reinforcement.

As previously mentioned, it may be possible or desirable in some applications to deform only a portion of the ply 30 during the layup process. Deformation of the carrier film 32 can be tailored to selectively constrain the elasticity of the ply carrier film 32 using any of several techniques that suit part geometry and forming requirements. FIG. 13 illustrates a carrier film 32 having a section 32c that includes a reinforcement 58 which resists deforming as the carrier film 32 is being deformed during the layup process. In this example, the reinforcement of section 32c is achieved by impregnating unidirectional fibers 60 into the carrier film 32, oriented in the direction that the carrier film 32 is to be deformed, which in this example, is along the X axis 44.

Prior to deformation, carrier film 32 has a length $L_1$ and the reinforced section 32c has a width $R_1$ as shown in FIG. 13. When the carrier film 32 is deformed along the X axis 44, which corresponds to the axial direction of the fibers 60, the fibers 60 do not deform substantially, consequently the width $R_1$ of the reinforced section 32c remains substantially the same while the overall length of the carrier film 32 deforms to $L_2$ as a result of the non-reinforced sections 32a, 32b of the film 32 on each side of the reinforced section 32c being allowed to deform. It may also be possible to employ a reinforcement 58 in the reinforced section 32c which allows some degree of deformation of the carrier film 32, but less than other, non-reinforced areas of the carrier film 32. The reinforcement 58 may comprise, for example and without limitation, cross stitching (not shown) in the carrier film 32. Depending on the type of reinforcement that is used, the width W of the reinforced section 32c may or may not become more narrow when the carrier film 32 is stretched.

Figure 14:
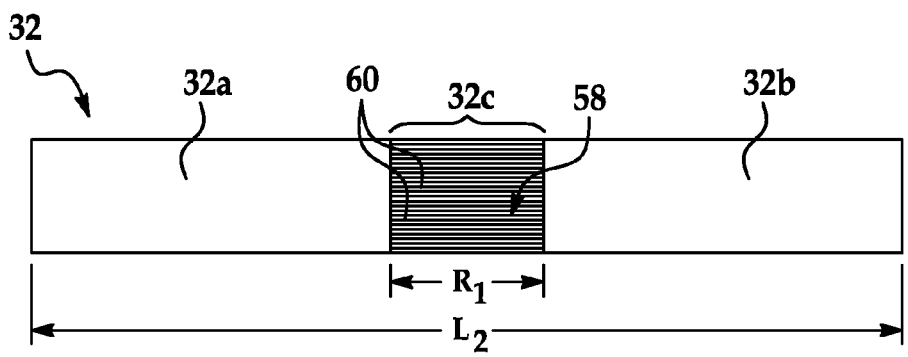
FIG. 14 is an illustration similar to FIG. 13 but showing portions of the carrier film having been deformed.
Figure 15:
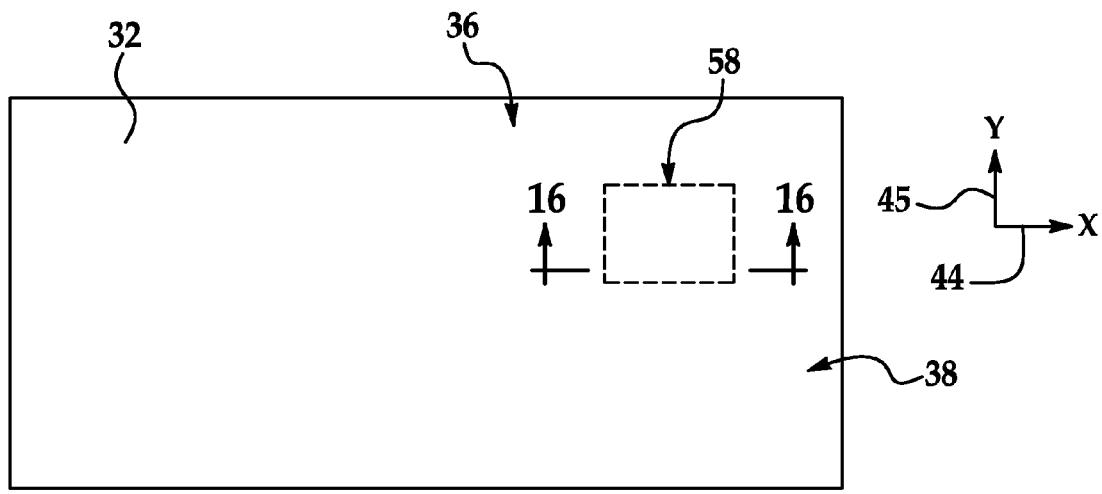
FIG. 15 is an illustration of a plan view of a carrier film having an isolated area of reinforcement therein.

In the case of the example shown in FIGS. 13 and 14, the reinforced section 32c is centrally located within the carrier film 32 and the reinforcement 58 extends across its entire width W. FIG. 15 illustrates an example in which the area of reinforcement 58 is spaced inwardly from the edge margins 36, 38 of the carrier film 32 and is disposed off-center within the area of the carrier film 32. As in the example shown in FIGS. 13 and 14, the area of reinforcement 58 shown in FIG. 15 also may incorporate reinforcing fibers 60 (see FIG. 14) into the carrier film 32 which may be unidirectional or multi-directional. For example, the fibers 60 may be woven together and incorporated into the carrier film 32 in a manner that resists deforming in two orthogonal directions, e.g. along the X and Y axes 44, 45, corresponding to the orientations of the reinforcing fibers. Similarly, fibers 60 may be placed in additional orientations, e.g. 45 degree orientations, to resist deformation of the carrier film 32 within the area of reinforcement 58 in other directions. While the area of reinforcement 58 is shown as being generally square in shape, a variety of other shapes are possible.

Figure 16:
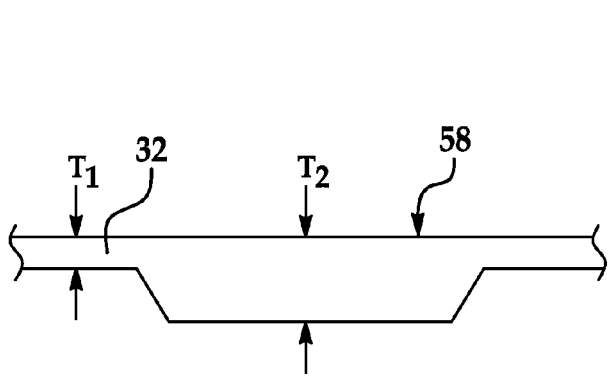
FIG. 16 is an illustration of a sectional view taken along the line 16-16 in FIG. 15.
Figure 17:
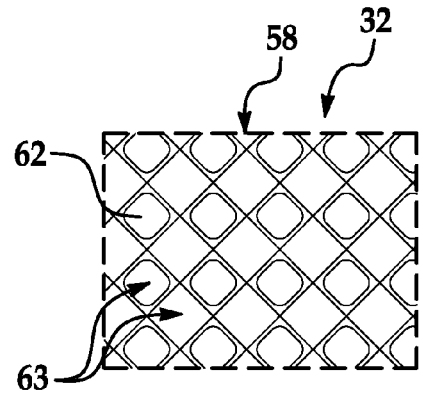
FIG. 17 is an illustration of a carrier film having an integrally formed embossment.

Other reinforcing techniques to prevent or reduce local deformation of the carrier film 32 are possible. For example, as shown in FIG. 16, the substantially non-deformable, area of reinforcement 58 of FIGS. 13, 14 and 15 may be achieved by increasing the thickness $T_1$ of a carrier film 32 to a thickness $T_2$ in the area of reinforcement 58. FIG. 17 illustrates another technique for achieving the desired reinforcement, in which the carrier film 32 includes embossed dimples 62 in a desired pattern 63, in this case, diamonds that resist deforming in one or more directions. In some applications, it may be desirable to employ more than one of the above described techniques to achieve substantially non-deformable areas of reinforcement 58. For example, and without limitation, a combination of embossed dimples 62, increased film thickness $T_2$ and reinforcing fibers 60 may be used. It may also be possible to use one or more of the above reinforcement techniques to achieve differing degrees of film elongation in differing regions of the carrier film 32.

Figure 18:
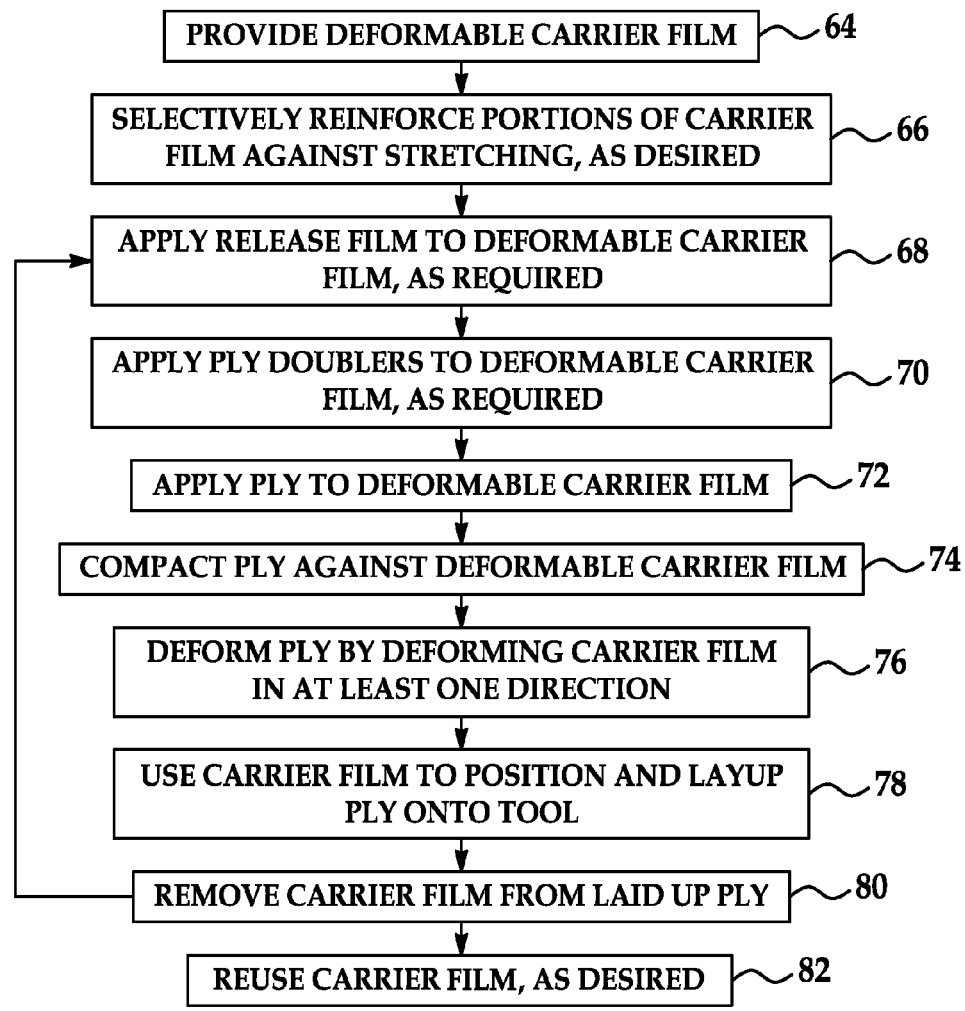
FIG. 18 is an illustration of a flow diagram of a method of laying up a composite structure using a deformable carrier film for ply layup.

Attention is now directed to FIG. 18 which broadly illustrates the steps of a method of laying up plies to form a composite part using the deformable carrier film 32 previously described. Beginning at 64, a deformable carrier film 32 is provided having a size and shape suitable for the application and the plies 30 to be laid up. At 66, portions of the deformable carrier film 32 may be reinforced, as desired. At 68, a release film (FIG. 12) may be applied to the deformable carrier film 32, as required, to aid in the removal of the carrier film 32 from the ply 30 following layup. At 70, one or more ply doublers 54 (FIG. 12) or other materials may be applied to the deformable carrier film 32, as desired.

At 72, a prepreg ply 30 is applied to the deformable carrier film 32 either manually, or using automated equipment to lay down courses 48 (FIG. 4) of prepreg material in a side-by-side, possibly substantially abutting relationship on the carrier film 32. The ply 30 is laid up on the carrier film 32 in a reversed, mirror image-like fashion such that the left and right of the ply 30 are reversed. By reversing the ply 30 on the carrier film 32, the ply 30 will have the proper orientation when transferred from the carrier film 32 to a tool 90 (see FIG. 20). At 74, the ply material, including any doublers and/or release films are compacted against the deformable carrier film 32. This compaction may be performed mechanically with a hand sweep (not shown) or using a vacuum either with or without the application of heat. At 76, the carrier film 32 is deformed in at least one direction, thereby deforming the ply 30 to the desired shape and/or dimensions best suited for layup on the tool 90, including the shape and topography of the tool 90. At 78, with the ply 30 located on the carrier film 32, and positioned between the carrier film 32 and the tool 90, the carrier film 32 is used to position and layup the ply 30 onto a tool 90 (see FIG. 20). At 80, following layup of the ply 30 onto the tool 90, the carrier film 32 is removed, as by peeling it away from the laid-up ply 30. At 82, the carrier film 32 may be reused, if desired, or discarded. Steps 68-80 may be repeated until all of the plies 30 of the part layup have been laid up.

Figure 19:
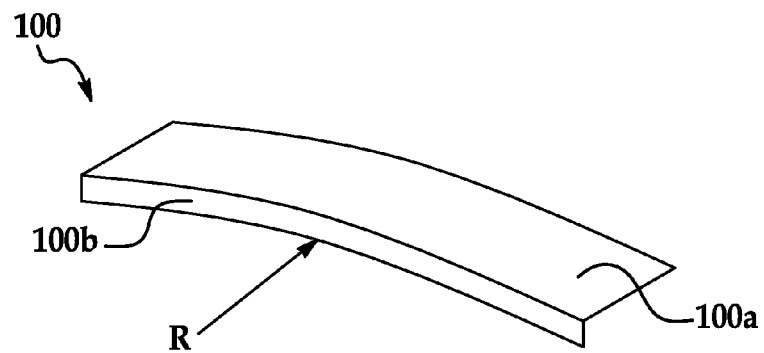
FIG. 19 is an illustration of a perspective view of a composite stiffener.
Figure 20:
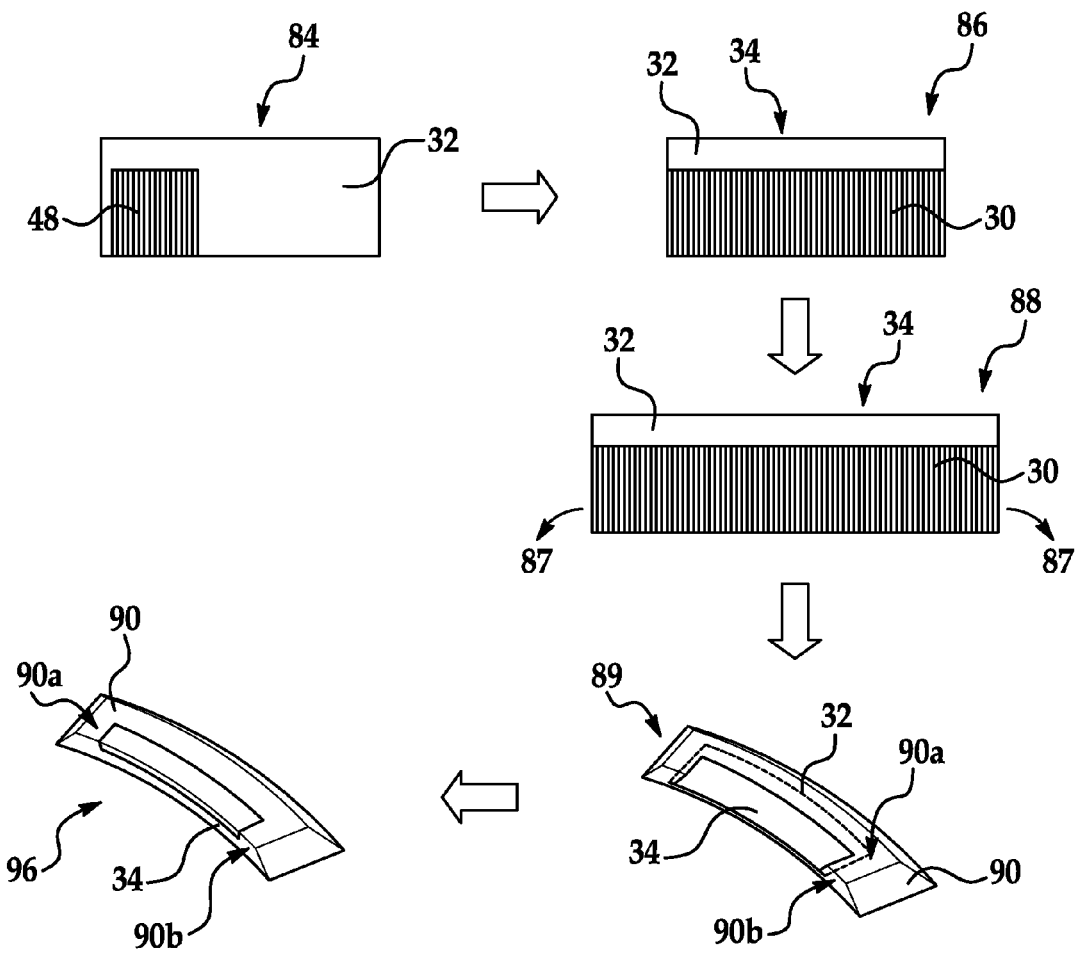
FIG. 20 is an illustration of diagrammatic views showing the steps of a method for laying up composite plies using the deformable carrier film to form the stiffener shown in FIG. 19.

FIG. 20 diagrammatically illustrates the steps of the layup method shown in FIG. 18, in which a curved composite structure comprising a stiffener 100 shown in FIG. 19 having at least two legs and radius of curvature R is laid up on a tool 90. The tool 90 includes two contiguous, curved tool surfaces 90a, 90b for respectively forming a first leg comprising a curved web 100a and a second leg comprising a curved flange 100b of the stiffener 100 shown in FIG. 19. As shown at 84, courses 48 of unidirectional prepreg material are laid down side-by-side on a deformable carrier film 32 to form a completed 90 degree ply 30 shown at 86. The completed ply 30 is then compacted onto the carrier film 32, following which at 88, the carrier film 32 is then stretched and deformed radially as shown by arrows 87 to generally match the curvature of the tool surface 90a. As shown at 89, the ply 30 is deformed into a fan shape and placed onto the curved tool surface 90a using the carrier film 32 to form the curved web 100a of the stiffener 100. The carrier film 32 and a peel ply (not shown) may then be removed from the partially formed ply 30. With the carrier film 32 having been removed, the ply 30 is then formed down over the curved tool surface 90b as shown at 96, to form the curved flange 100b of the stiffener 100. While the above example illustrates the use of the carrier film 32 to form plies along curves in a single plane, the carrier film 32 may also be used to form plies over tools (not shown) having compound curved surfaces, joggles, etc. Moreover, the carrier film 32 may be employed to form ply layups having more than two legs, used to fabricate structures possessing, for example, a "C" or a "Z" shaped cross section.

Figure 21:
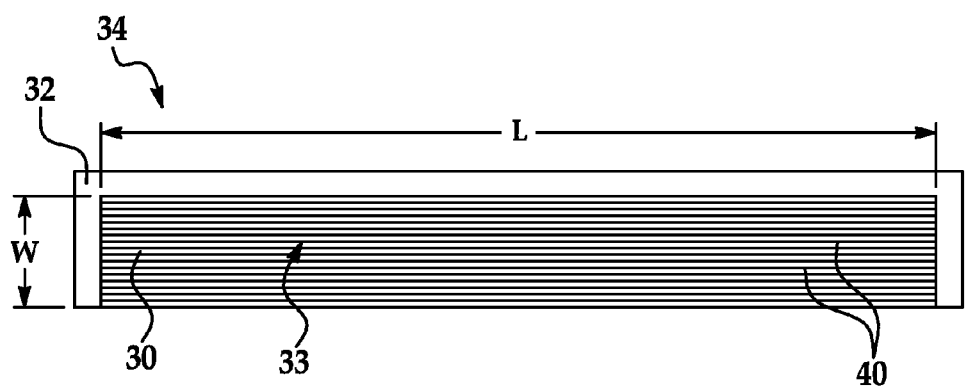
FIG. 21 is an illustration of a plan view of a ply carrier assembly having a zero degree ply.

FIG. 21 illustrates a ply carrier assembly 34 comprising a straight zero degree ply 30 placed on and adhered to a deformable carrier film 32. In contrast to previously discussed configurations in which the ply 30 is fabricated by steering individual narrow strips of slit tape or tows onto a curved tool (e.g. the tool 90 shown in FIG. 20), the zero degree ply 30 shown in FIG. 21 may be formed by laying down a single straight length of tape 33 having a length L, and a width W that may be sufficiently wide to form both the web 100a and the flange 100b of the stiffener 100 shown in FIG. 19. While the illustrated stiffener 100 has only two legs (web 100a and flange 100b), stiffeners may be fabricated having more than two legs and other cross sectional shapes, including but not limited to a "C" shape and a "Z" shape. The tape 33 used to form the ply 30 may comprise unidirectional composite prepreg tape cut from a reel or roll of tape (not shown) in which the unidirectional reinforcing fibers 40 are oriented in the longitudinal direction of the ply carrier assembly 34.

Figure 22:
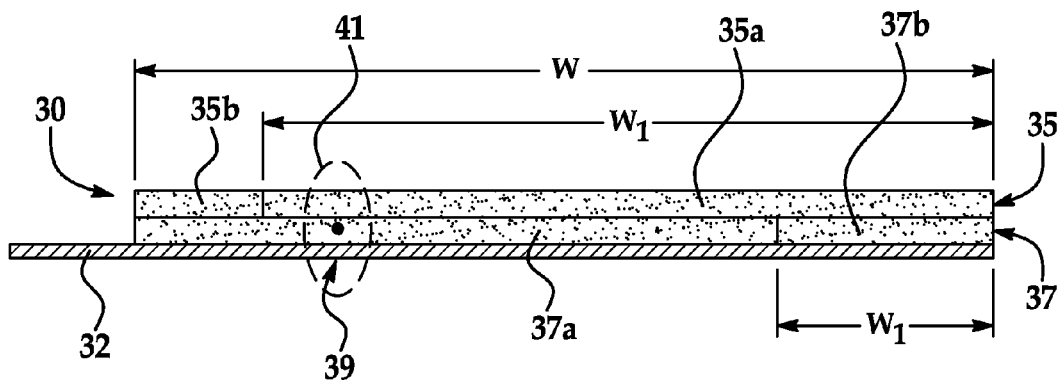
FIG. 22 is an illustration of a cross sectional view of an alternate ply carrier assembly in which the zero degree ply includes multiple layers of tape segments.

As shown in FIG. 22, it may be possible to form the zero degree ply 30 using multiple layers 35, 37 of straight tape having a width $W_1$ that is less than the width W of the ply 30, but greater than that of a typical tow (not shown). In some examples, each layer 35, 37 may comprise one or more segments 35a, 35b, 37a, 37b of tapes which preferably span an area 41 where the ply 30 is to be formed around a curved bend line or axis 39 during a subsequent forming step. Additionally, segments 35a, 35b, 37a, 37b may be formed in sequential operations in order to eliminate the overlap region from creating the behavior of fiber shearing over long distances.

Figure 23:
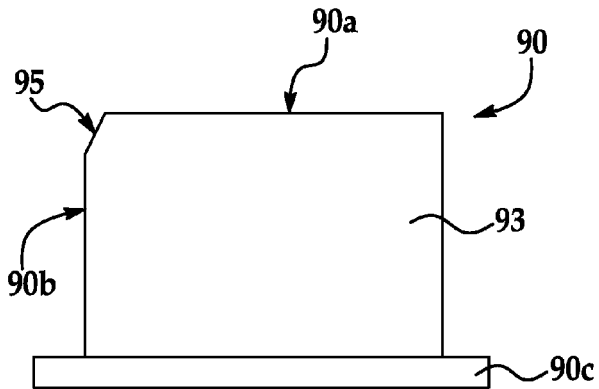
FIG. 23 is an illustration of an end view of a curved forming tool.

FIG. 23 illustrates a curved forming tool 90 similar to the tool 90 previously discussed in connection with FIG. 20. The curved forming tool 90 comprises a curved main body 93 supported on a tool base 90*c*. The curved forming tool 90 includes a first curved forming surface 90*b* used to form a first leg of a structure such as the flange 100*b* of the stiffener 100 shown in FIG. 19, and a second curved forming surface 90*a* for forming a second leg of the structure such as the web 100*a* of stiffener 100. A chamfer 95 or a radius corner (not shown) may be provided at the intersection of the curved tool surfaces 90*a*, 90*b* in order to assist in folding or bending one of more of the zero degree plies 30 during the forming process so as to avoid stress concentrations in the ply being formed.

Figure 24:
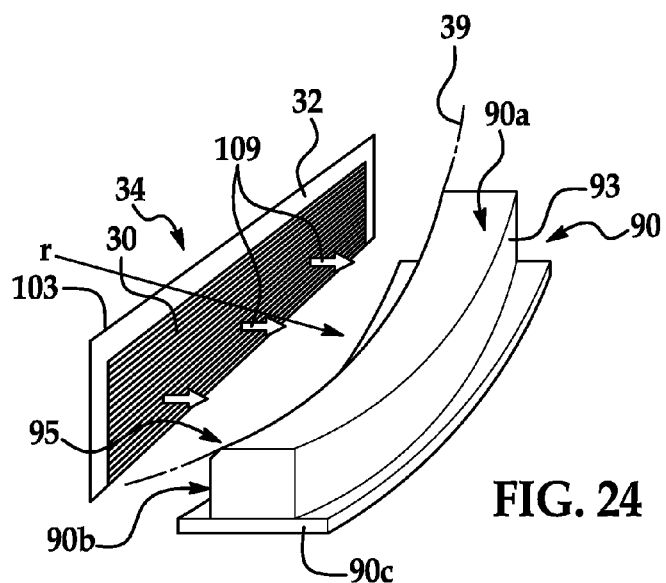
FIG. 24 is an illustration of a perspective view of the curved forming tool shown in FIG. 23, with a ply carrier assembly positioned in readiness to be formed onto the tool.

FIG. 24 shows a ply carrier assembly 34 having a substantially flat zero degree ply 30 about to be steered onto the tool 90. In this example, the ply carrier assembly 34 has been placed on a substantially flat tool 103 that may used to transport the ply carrier assembly 34 to the location of the tool 90, and which may also be used to assist in steering the ply 30 onto the curved tool surface 90*b*, as shown by the arrows 109. The numeral 39 designates a curved axis or bend line having a radius of curvature r about which the ply carrier assembly 34 will be folded or bent in a later discussed forming step.

Figure 25:
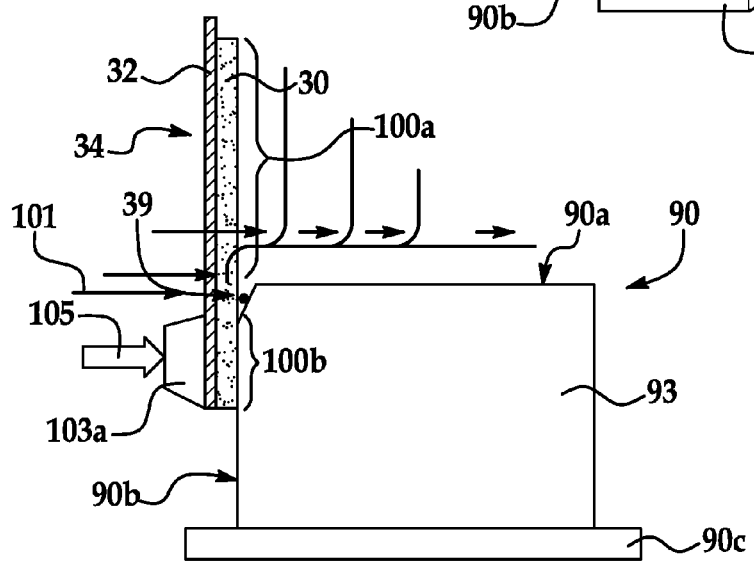
FIG. 25 is an illustration similar to FIG. 23 but showing a first portion of a ply carrier assembly having been steered and clamped onto a first curved surface of the tool.
Figure 26:
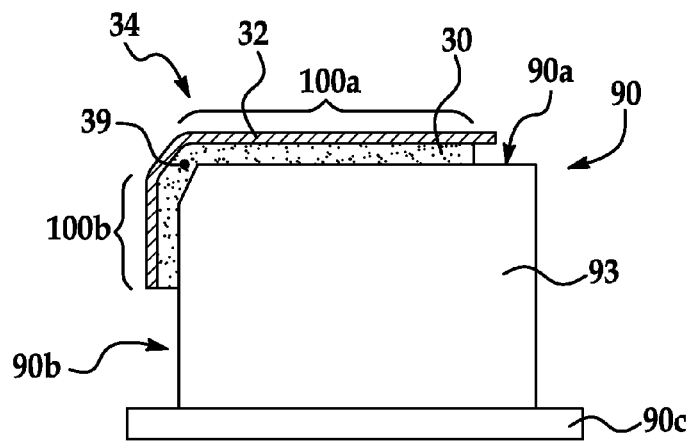
FIG. 26 is an illustration similar to FIG. 25 but showing a second portion of the ply carrier assembly having been formed onto a second curved surface of the tool.
Figure 27:
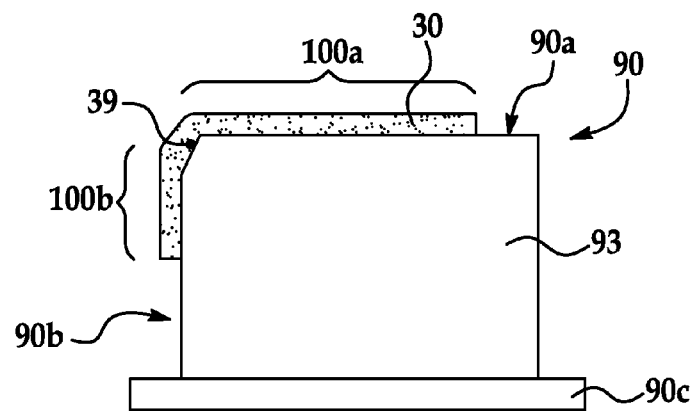
FIG. 27 is an illustration similar to FIG. 26 but showing the deformable carrier film having been removed from the formed ply.

FIG. 25 illustrates the ply carrier assembly 34 having been steered onto and conformed to the first curved tool surface 90*b* of the tool 90, and wherein the flange portion 100*b* of the ply 30 has been clamped against the curved tool surface 90*b* using a suitable clamping device 103*a* and clamping force shown at 105. With the flange portion 100*b* clamped against the curved tool surface 90*b*, the remaining web portion 100*a* of the ply 30 is formed onto the second curved tool surface 90*a*, as shown by the arrow 101. In this second forming step, the web portion 100*a* is pushed over the bend line 39, creating an "L" shape in the carrier film 32 and web portion 100*a* of the ply, as shown in FIG. 25, while the flange portion 100*b* of the ply 30 remains clamped against the first curved tool surface 90*b*. Following this second forming step, the zero degree ply 30 is fully formed onto the curved tool surface 90*a*, as shown in FIG. 26. Then, as shown in FIG. 27, the carrier film 32 (not shown) may be removed from the ply 30. During each of the forming steps described above, the carrier film 32 may be stretched or otherwise deformed in order to alter the orientation of the fibers 40 (FIG. 21), as the tape 33 is sheared onto the curved tool surfaces 90*a*, 90*b*.

As previously discussed, the carrier film 32 functions to stabilize the ply 30 as it is sheared into place on the tool 90, and may be deformed, as by stretching during the forming process to aid in controlling the orientation of the fibers 40 (FIG. 21) in the tape 33 so that they deform in a desired manner and assume a desired orientation that results in a stiffener 100 which exhibits desired performance characteristics.

Figure 28:
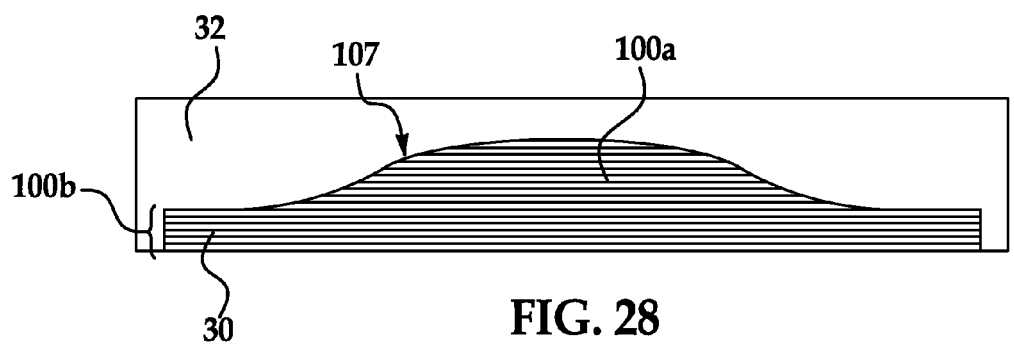
FIG. 28 is an illustration of a plan view of an alternate ply carrier assembly in which an edge of a zero degree ply has been contoured.
Figure 29:
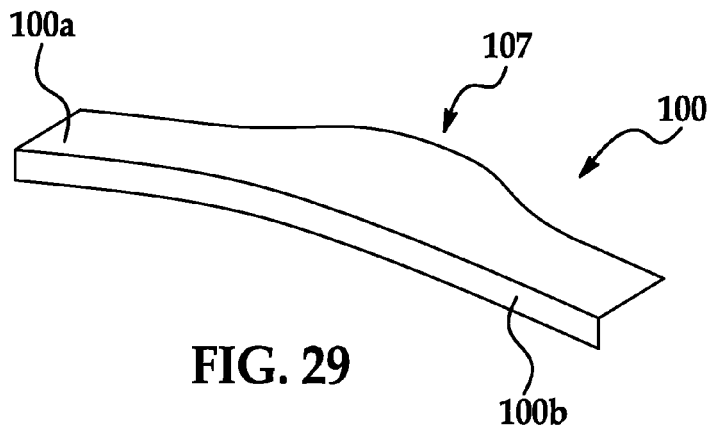
FIG. 29 is an illustration of a perspective view of a composite structure having a contoured edge fabricated from the contoured ply shown in FIG. 28.

As the ply 30 is being laid up onto the carrier film 32, it may be possible to trim one or more edges of the ply 30 to achieve a desired edge contour on the finished part. For example, referring to FIG. 28, a zero degree ply 30 formed from unidirectional prepreg tape includes a web portion 100*a* and a flange portion 100*b*. The outer edge of the web portion 100*a* may be trimmed as by cutting to form a contoured edge 107 prior to the placing the ply 30 on the carrier film 32. Following forming of the ply 30 over the contoured tool 90 shown in FIGS. 23-27, the finished stiffener 100 includes a web 100*a* having the contoured edge 107 as shown in FIGS. 28 and 29. In other configurations, it may be possible to form the contoured edge 107 by cutting both the ply 30 and the carrier film 32 after the ply 30 has been placed on the carrier film 32.

Figure 30:
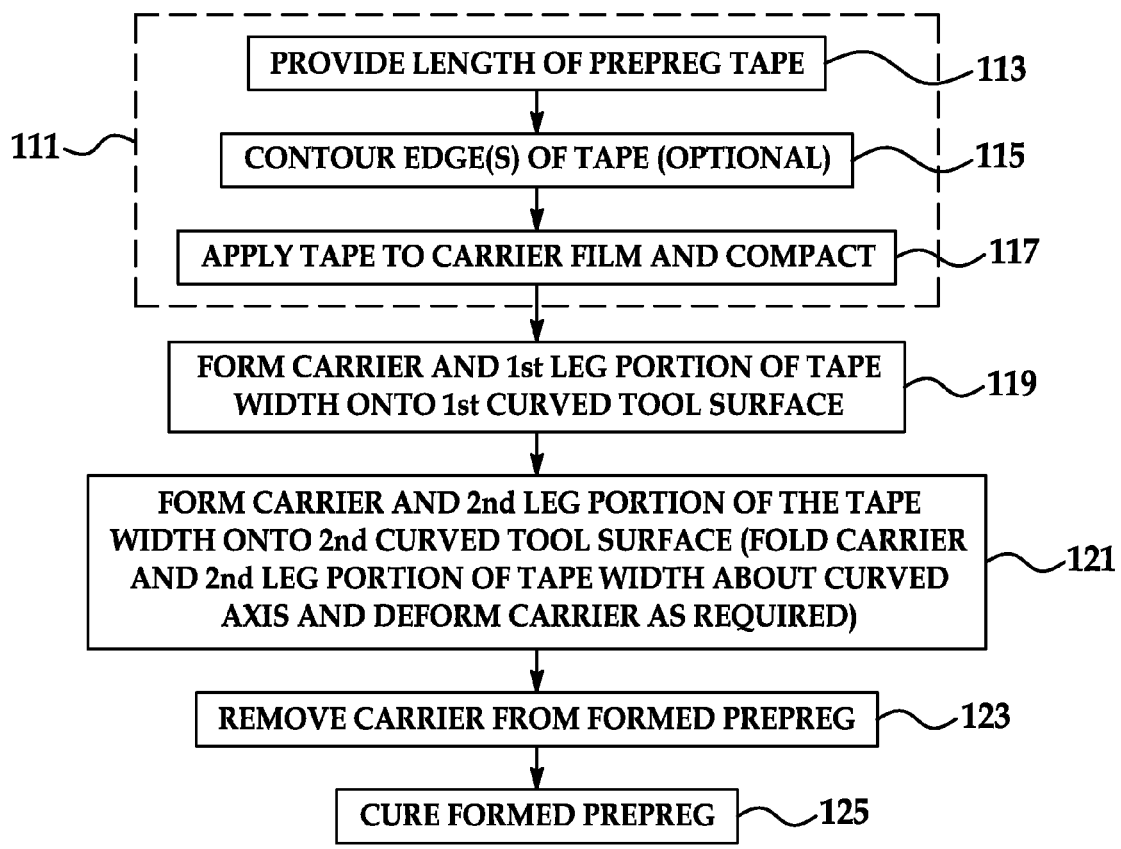
FIG. 30 is an illustration of a flow diagram of a method of forming a curved composite structure.

Attention is now directed to FIG. 30 which illustrates the overall steps of a method of fabricating a composite structure, such as the stiffener 100 shown in FIGS. 19 and 29 that has compound curves or contours. At 111*a* ply 30 is laid up by providing a length of unidirectional prepreg tape at 113, contouring the edges of the tape, if desired at 115 and then applying and compacting the tape on a carrier film 32 at step 117. At 119, the carrier film 32 and a first leg or flange portion 100*b* of the ply 30 is formed onto a first curved tool surface 90*b*, as previously described in connection with FIGS. 25 and 26. Next, at 121, the carrier film 32 and a second leg or web portion 100*a* of the prepreg tape ply 30 is formed onto the second curved tool surface 90*a*, (see FIGS. 26 and 27). This second step of the forming process may be carried out by folding or bending the second leg or web portion 100*a* of the tape ply 30 about the bend line 39 (FIG. 25) while the carrier film 32 is being deformed, as by stretching, to control the fiber angles during the forming process. Following step 121, the carrier film 32 may be removed from the formed prepreg, as shown at 123. Finally, at 125, the formed prepreg may be cured.

Figure 31:
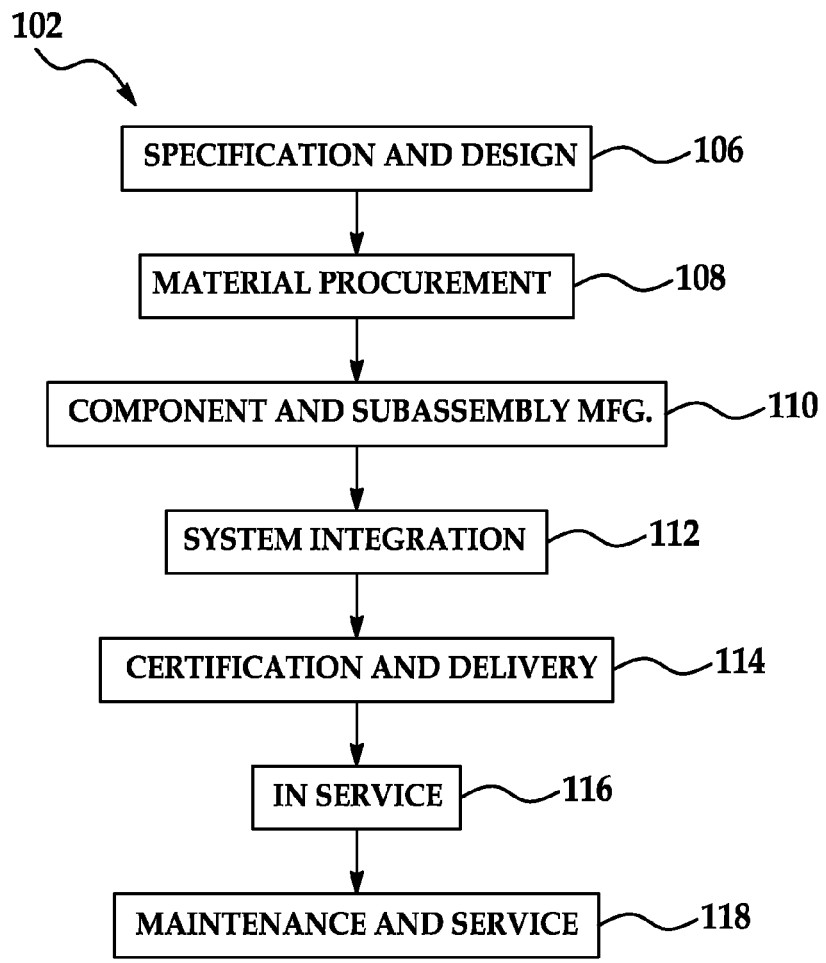
FIG. 31 is an illustration of a flow diagram of aircraft production and service methodology.
Figure 32:
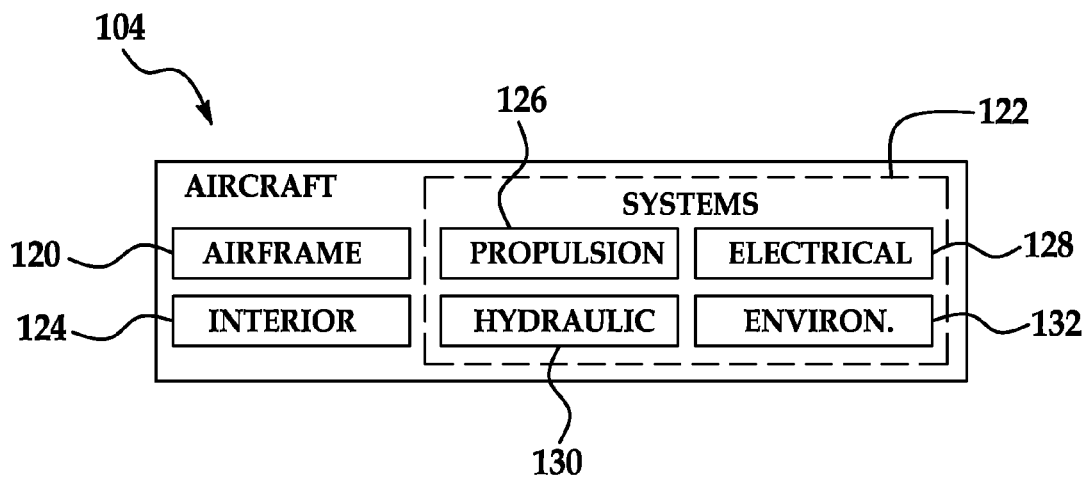
FIG. 32 is an illustration of a block diagram of an aircraft.

Referring to FIGS. 31 and 32, configurations of the disclosure may be used in the context of an aircraft manufacturing and service method 102 as shown in FIG. 31 and an aircraft 104 as shown in FIG. 32. During pre-production, exemplary method 102 may include specification and design 106 of the aircraft 104 and material procurement 108. During production, component and subassembly manufacturing 110 and system integration 112 of the aircraft 104 takes place. During step 110, the disclosed method and apparatus may be employed to fabricate composite parts such as fuselage frame sections and stiffeners which are then assembled at step 112. Thereafter, the aircraft 104 may go through certification and delivery 114 in order to be placed in service 116. While in service by a customer, the aircraft 104 may be scheduled for routine maintenance and service 118 (which may also include modification, reconfiguration, refurbishment, and so on).

Each of the processes of exemplary method 102 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 32, the aircraft 104 produced by exemplary method 102 may include an airframe 120 with a plurality of systems 122 and an interior 124. The disclosed method and apparatus may be employed to fabricate frame sections and stiffeners which form part of the airframe 120. Examples of high-level systems 122 include one or more of a propulsion system 126, an electrical system 128, a hydraulic system 130, and an environmental system 132. Any number of other systems may be included. Although an aerospace example is shown, the principles of the disclosure may be applied to other industries, such as the automotive industry.

The apparatus disclosed herein may be employed during any one or more of the stages of the production and service method 102. For example, components or subassemblies corresponding to production process 110 may be fabricated or manufactured in a manner similar to components or subassemblies produced while the aircraft 104 is in service. Also, one or more apparatus configurations may be utilized during the production stages 110 and 112, for example, by substantially expediting assembly of or reducing the cost of an aircraft 104. Similarly, one or more apparatus configurations may be utilized while the aircraft 104 is in service, for example and without limitation, to maintenance and service 118.

Although the configurations of this disclosure have been described with respect to certain exemplary configurations, it is to be understood that the specific configurations are for purposes of illustration and not limitation, as other variations will occur to those of skill in the art.

What is claimed:

1. A method of laying up a composite part on a tool, comprising:
   providing a composite resin tape reinforced with unidirectional fibers having a substantially zero degree fiber orientation;
   placing the composite resin tape on a deformable carrier film;
   forming the composite resin tape and the carrier film onto a first curved surface on a forming tool;
   forming the composite resin tape and the carrier film about a curved axis onto a second curved surface on the forming tool; and
   removing the carrier film from the composite resin tape;
   wherein forming the composite resin tape and the carrier film includes deforming the composite resin tape and the carrier film by stretching the carrier film, stretching comprising changing one of a length or a width of the carrier film.

2. The method of claim 1, wherein placing the composite resin tape on the carrier film includes compacting the composite resin tape against the carrier film.

3. The method of claim 1, further comprising:
   contouring at least one edge of the composite resin tape along its length.

4. The method of claim 3, wherein contouring the at least one edge of the composite resin tape is performed by cutting the composite resin tape along the edge.

5. The method of claim 1, wherein deforming the carrier film is performed as the composite resin tape and the carrier film are being formed onto the second curved surface of the forming tool.

6. A method of fabricating a curved composite structure having at least two curved legs, comprising:
   providing a composite prepreg tape having unidirectional reinforcing fibers with a substantially zero degree fiber orientation;
   adhering the composite prepreg tape to a film;
   forming a first leg of the curved composite structure by forming the film and a first portion of a width of the composite prepreg tape over a first curved surface of a forming tool;
   forming a second leg of the curved composite structure by forming the film and a second portion of the width of the composite prepreg tape onto a second curved surface of the forming tool;
   removing the film from the composite prepreg tape formed over the forming tool; and
   curing the composite prepreg tape formed over the forming tool;
   wherein forming the film and the composite prepreg tape includes deforming the film and the composite prepreg tape by stretching the film, stretching comprising changing one of a length or a width of the film.

7. The method of claim 6, wherein forming the second leg is performed by pressing the film and shearing the second portion of the width of the composite prepreg tape about a curved bend line onto the second curved surface of the forming tool.

8. The method of claim 6, further comprising:
   contouring at least one edge of the composite prepreg tape along its length.

9. The method of claim 8, wherein contouring the at least one edge of the composite prepreg tape is performed by cutting the tape along the at least one edge.

10. A method of fabricating a composite stiffener having a curved web and at least one curved flange, comprising:
    placing a substantially straight unidirectional prepreg tape on a carrier;
    forming the at least one curved flange by using the carrier to steer a first portion of the unidirectional prepreg tape onto a first curved tool surface; and
    forming the curved web by using the carrier to form a second portion of the unidirectional prepreg tape onto a second curved tool surface;
    wherein forming the curved web includes deforming the carrier and the unidirectional prepreg tape by stretching the carrier, stretching comprising changing one of a length or a width of the carrier.

11. The method of claim 10, wherein forming the curved web includes deforming the carrier as the second portion of the unidirectional prepreg tape is being formed onto the second curved tool surface.

12. The method of claim 10, wherein:
    steering the first portion of the unidirectional prepreg tape includes a steering a first portion of a width of the unidirectional prepreg tape, and
    forming the second portion of the unidirectional prepreg tape includes forming a second portion of the width of the unidirectional prepreg tape.

13. The method of claim 10, wherein a single width of the unidirectional prepreg tape is used to form the at least one curved flange and the curved web.

14. The method of claim 10, wherein forming the curved web includes shearing a portion of a width of the unidirectional prepreg tape about a curved bend line onto the second curved tool surface.

15. The method of claim 10, further comprising:
    removing the carrier from the unidirectional prepreg tape after the curved web and the at least one curved flange have been formed; and
    curing the unidirectional prepreg tape.

16. The method of claim 10, further comprising:
    clamping the at least one curved flange against the first curved tool surface, and
    wherein forming the curved web is performed while the at least one curved flange is clamped against the first curved tool surface.

17. The method of claim 10, wherein placing the unidirectional prepreg tape on the carrier includes forming overlapping segments of the unidirectional prepreg tape on the carrier by sequentially forming offset segments of the unidirectional prepreg tape on the carrier.

18. The method of claim 17, wherein placing the unidirectional prepreg tape on the carrier includes overlapping the segments.

19. The method of claim 16, further comprising:
    contouring an edge of the unidirectional prepreg tape along its length before the at least one curved flange and the curved web are formed.

20. A method of laying up a multi-ply composite part on a tool having contoured surfaces to which a layup is to conform, comprising:
    providing a deformable carrier film;
    reinforcing a portion of the carrier film against deforming, including impregnating the carrier film with reinforcing fibers;
    placing a composite doubler on a surface of the carrier film;

placing a strip of release film on the surface of the carrier film;

placing a zero degree prepreg ply on the surface of the carrier film overlying the composite doubler and the strip of release film, including laying down a plurality of courses of unidirectional prepreg fiber tape in a side-by-side relationship on the surface of the carrier film;

compacting the zero degree prepreg ply, the composite doubler and the strip of release film against the carrier film;

using the carrier film to transport the zero degree prepreg ply to tool;

using the carrier film to layup the composite doubler, the strip of release film and the zero degree prepreg ply on the tool, including deforming the zero degree prepreg ply by deforming the carrier film to cause the zero degree prepreg ply to conform to contoured areas of the tool wherein deforming the carrier film includes deforming the carrier film and the zero degree prepreg ply by stretching the carrier film, stretching comprising changing one of a length or a width of the carrier film; and removing the carrier film from the zero degree prepreg ply when the zero degree prepreg ply has been laid up and conformed to the tool.

* * * * *